(No Model.)  W. W. GRANT.  5 Sheets—Sheet 1.
GAS ENGINE.

No. 525,651.   Patented Sept. 4, 1894.

Fig. 1.

Witnesses.
Robert Everitt.
Thos. A. Gunn

Inventor.
William Wallace Grant.
By James L. Norris.
Atty.

(No Model.)

W. W. GRANT.
GAS ENGINE.

Patented Sept. 4, 1894.

Witnesses.
Robert Garrett
Thos. A. Green

Inventor.
William Wallace Grant.
By James L. Norris
Atty.

(No Model.)

W. W. GRANT.
GAS ENGINE.

Patented Sept. 4, 1894.

Witnesses.
Robert Burritt
Thos. A. Green

Inventor:
William Wallace Grant.
By James L. Norris
Atty.

(No Model.)  W. W. GRANT.  5 Sheets—Sheet 4.
GAS ENGINE.

No. 525,651.  Patented Sept. 4, 1894.

Fig. 4.

Witnesses.
Robert Everett
Thos. A. Green

Inventor:
William Wallace Grant.
By James L. Norris.
Atty.

(No Model.) 5 Sheets—Sheet 5.

W. W. GRANT.
GAS ENGINE.

No. 525,651. Patented Sept. 4, 1894.

Witnesses.
Robert Everett
Thos. A. Green

Inventor.
William Wallace Grant.
By James L. Norris.
Atty.

UNITED STATES PATENT OFFICE.

WILLIAM WALLACE GRANT, OF BROOKLYN, NEW YORK.

GAS-ENGINE.

SPECIFICATION forming part of Letters Patent No. 525,651, dated September 4, 1894.

Application filed February 24, 1894. Serial No. 501,398. (No model.)

*To all whom it may concern:*

Be it known that I, WILLIAM WALLACE GRANT, a citizen of the United States, residing at Brooklyn, in the county of Kings and State of New York, have invented new and useful Improvements in Gas-Engines, of which the following is a specification.

This invention relates more particularly to gas engines of somewhat the character described in Letters Patent granted to me May 9, 1893, No. 497,239, and February 6, 1894, No. 514,359, and designed to operate through the agency of motive energy derived, preferably, from or through the combustion of an explosive admixture of gases, such, for instance, as atmospheric air mixed with a hydrocarbon. Through the ignition and explosion of such a compound, impulse is imparted to a pair of simultaneously acting pistons, and power thereby developed and transmitted. Hydrocarbon of a liquid character is preferably employed, although the engine is also operative with an admixture of fixed gases.

Foremost among the objects of my present invention are, first, greater safety in the employment of a liquid hydrocarbon; second, a form of engine construction adapted to develop a high speed; third, connection of the engine crank-shafts in such manner that they will be made to operate uniformly and in the same direction; fourth, employment of the engine crank-shaft connecting rod, bar or link to revolve a balance or fly-wheel, or wheels, or a shaft for driving machinery; fifth, to so locate the fly-wheel shaft or driving-shaft to one side of, centrally, and in a line at a right angle to the power cylinder, as to provide for transmitting and applying power to the best advantage; sixth, adaptability of the engine construction to an arrangement and operation of the fly-wheel shaft, at a higher or lower level than the power cylinder, or at such elevation as may be desirable or convenient for giving the best results in the transmission of power; seventh, availability for securing the operation of the valves at such points upon the engine stroke as may be desired, and thereby provide for the most effective working of the engine; and, further, to provide for economical application of motive energy without any wasteful expenditure thereof that would subject the engine to injurious strains.

My invention consists in features of construction and novel combinations of devices in a gas engine as hereinafter more particularly described and claimed.

In the annexed drawings illustrating the invention Fig. 3 is an elevation on the side opposite to Fig. 1, with the fly-wheel shaft in transverse section.

Referring to the drawings the numeral 20 designates a bed or frame of suitable form and dimensions to afford support, for the various parts of a high speed power engine.

The engine cylinder 21 is preferably arranged in a horizontal position, as shown, and incloses two pistons 22 and 23 that are caused to simultaneously recede from and approach each other. These pistons have their interior faces hemispherically hollowed, or provided with concaved recesses 24 that facilitate the economical application of expansive force and its concentration on the pistons. The outer faces of the pistons are provided with recesses 25 inclosing lugs 26 for pivotal attachment of pitman 27, that connect with cranks 28 on shafts 29 and 30, journaled at opposite ends of the engine. In this type of engine the length of stroke,—or distance between the inner faces of the pistons when at the extreme of their outward thrust,—is divided between two cranks, each of which operates through a stroke, which is one-half of that transpiring between the two pistons, that thus becomes available for the development of high speed.

In order to cause the two crank-shafts 29 and 30 to revolve in the same direction, they are connected by means of a link or connecting rod 31 that may be further utilized for transmitting power to a driving-shaft 32 arranged midway the length of the engine at any suitable elevation, and on which, a balance or fly-wheel 33 and band-wheel 34 may be mounted. The link, rod, or bar 31 may be connected with a crank 35 on the driving-shaft 32 and with cranks 36 on the two engine shafts. The cranks 36 may be adjustable on the ends of the engine shafts 29 and 30 to facilitate connection of the several parts in their proper relations. Instead of the cranks, and especially for imparting greater steadiness, there may be employed supplementary balance wheels (not shown) having wrist pins to which the connecting rod, bar or link 31 may be attached. While the usual form of making such connections may be adopted, I prefer to insert in the bearings or attaching portions of the link 31, hardened sleeves 37, of any good bearing material. These sleeves 37 are designed to fit tightly into the link or bar 31 and have a snug but easy working fit on the cranks, or fly wheel wrist-pins of the respective shafts, and when they become too much worn to longer respond to requirements, they may be easily, quickly, and cheaply replaced. The fly-wheel 33 may be obviously so mounted on the end of the shaft 32 as to be capable of connection with the link or rod 31 through a suitably located wrist-pin on said wheel. From the manner in which the pistons and engine crank shafts are arranged and connected through the link, rod or bar 31, it will be seen that the thrust of one of the pistons delivered to its pitman and connected crank-shaft, will force the crank 36 of that shaft outward and upward, while the thrust of the other piston on its pitman and crank-shaft, will force the corresponding crank of that shaft, outward and downward, thus causing the two crank shafts to revolve in the same direction, and transmit power, through the link or rod 31, to the driving shaft 32 and its fly-wheel 33, which may be suitably counter balanced. In this action of the engine the pistons simultaneously recede from and approach each other.

The driving-shaft 32, carrying the fly-wheel 33, is supported in bearings 38 so arranged that the said driving-shaft will occupy a position at one side of the engine cylinder at a right angle thereto and midway the length of the cylinder, preferably in the same horizontal plane with the engine crank shafts 29 and 30, or midway the height of the cylinder. Through its connection with the rod or link 31 the driving-shaft 32 is caused to rotate uniformly with and in the same direction as the two engine crank shafts. If it is desired to operate the shaft 32 and fly-wheel 33 at a higher or lower level than the engine crank shafts, the supports of the bearings 38 will be raised or lowered, as the case may be, and the form of the connecting rod or link 31 will be modified, as indicated by broken lines in Fig. 3, so that its central portion will present a proper angle for the required connection with the crank of the driving or fly-wheel shaft. In this way the shaft 32 and fly-wheel 33 may be easily and conveniently arranged at either a higher or a lower level than the center of the engine. By reference to Fig. 4 it will be observed that the engine bed or frame is arranged to afford ample support for the cylinder and engine crank shaft, not only, but is preferably so extended laterally as to afford a likewise ample support for the fly-wheel shaft and fly-wheel. By this construction of engine bed or frame, in which the engine is contained, the fly-wheel shaft is preserved in alignment and a shifting or settling, as between the engine and the fly-wheel shaft and its supports, is prevented.

Figure 4:
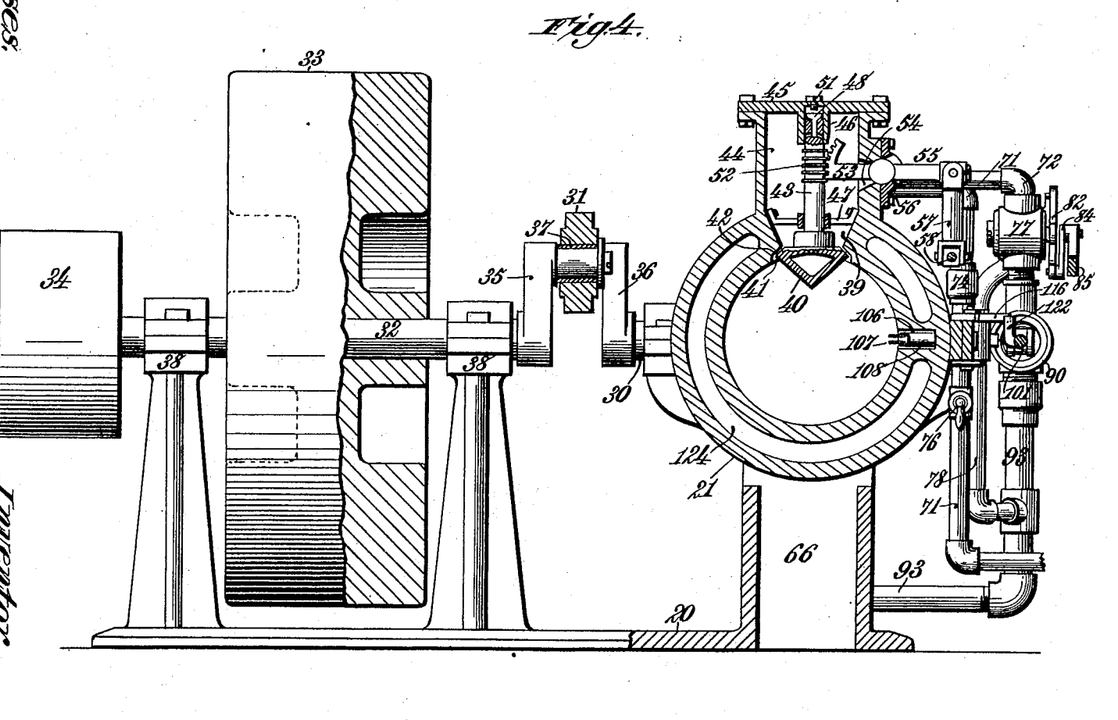
Fig. 4 is a cross-sectional elevation of the engine.
Figure 5:
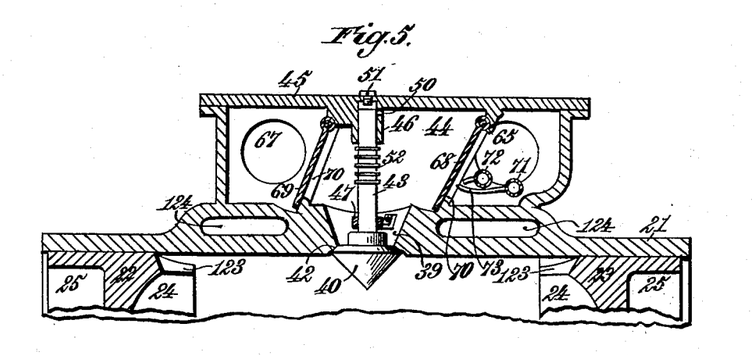
Fig. 5 is a vertical longitudinal section through a portion of the power cylinder and exterior charging and exhaust chamber.

A single charging and exhaust port 39, Figs. 4 and 5, is provided, preferably, in the top of the engine cylinder 21 and midway its length. This port 39 is controlled by a single puppet-valve 40 located in the cylinder and preferably of conical form and hollow. As the curve described by the interior of the cylinder does not afford a proper seat for the conical puppet-valve, the cylinder is recessed internally and at the required point, as shown at 41, Fig. 4, to provide a valve seat 42 within which the valve 40 may squarely, firmly and truly rest. Above the valve-seat 42, the single charging and exhaust port 39 is flared upward and outward to facilitate escape of the exhaust vapor or gas. The conical puppet valve 40 is arranged to reciprocate in a vertical line and is attached to a rod 43 that is extended into a charging and exhaust chamber 44 located on the outside of the cylinder. This chamber 44 is provided with a top or cover 45 having a depending tubular guide 46 to receive the upper end of the valve-rod. Another guide for the valve-rod 43 is afforded by a spider frame 47 secured in the valve-port. The upper end of the valve-rod 43 is hollowed, or formed with a cup 48, that communicates at its bottom with inclined radial passages 49 extended to the exterior of the rod. The cup 48 serves as a holder for a lubricant to be gradually distributed through the passages 49 to the interior of the tubular guide.

In the upper portion of the tubular guide 46 is an air vent 50 through which air may pass in and out, as the valve-rod is operated. Access to the tubular guide 46, for introduction of a lubricant into the cup 48 of the valve rod, is afforded by a perforation in the plate or cover 45 of the chamber 44 closed by a plain or threaded plug 51 that serves to prevent ejectment of the lubricant onto the outside of the chamber 44 when the valve 40 comes to its seat.

Figure 1:
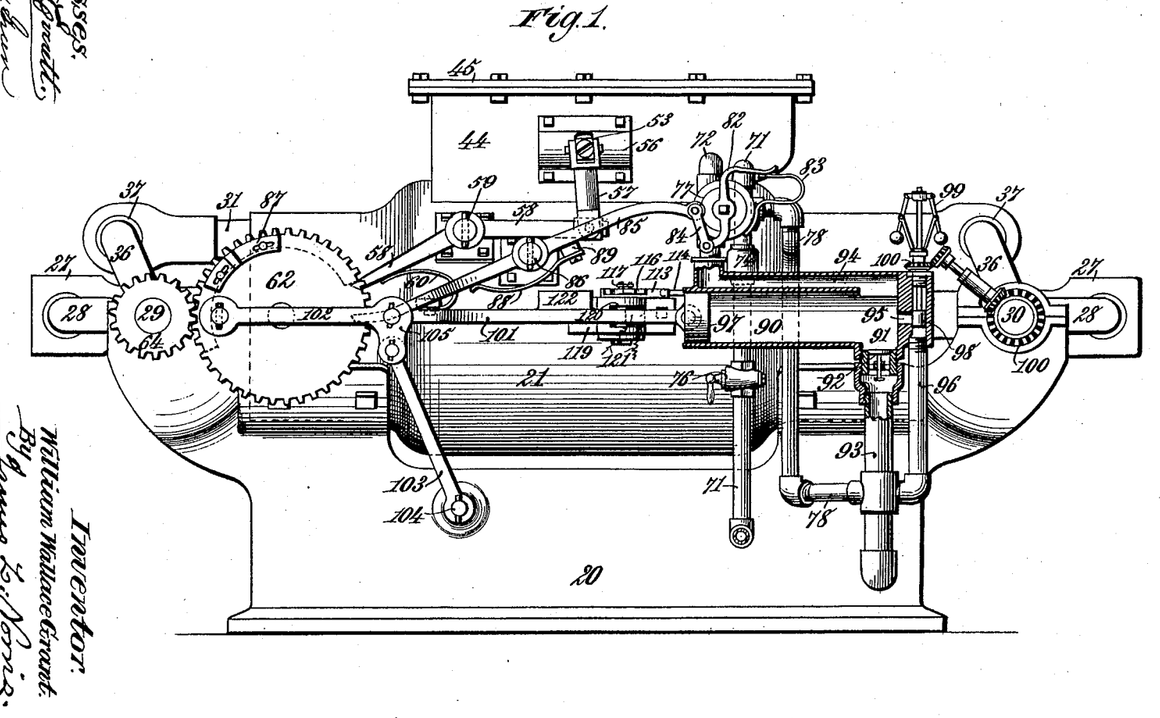
—Figure 1 is a side elevation of the gas engine, partly in section.
Figure 2:
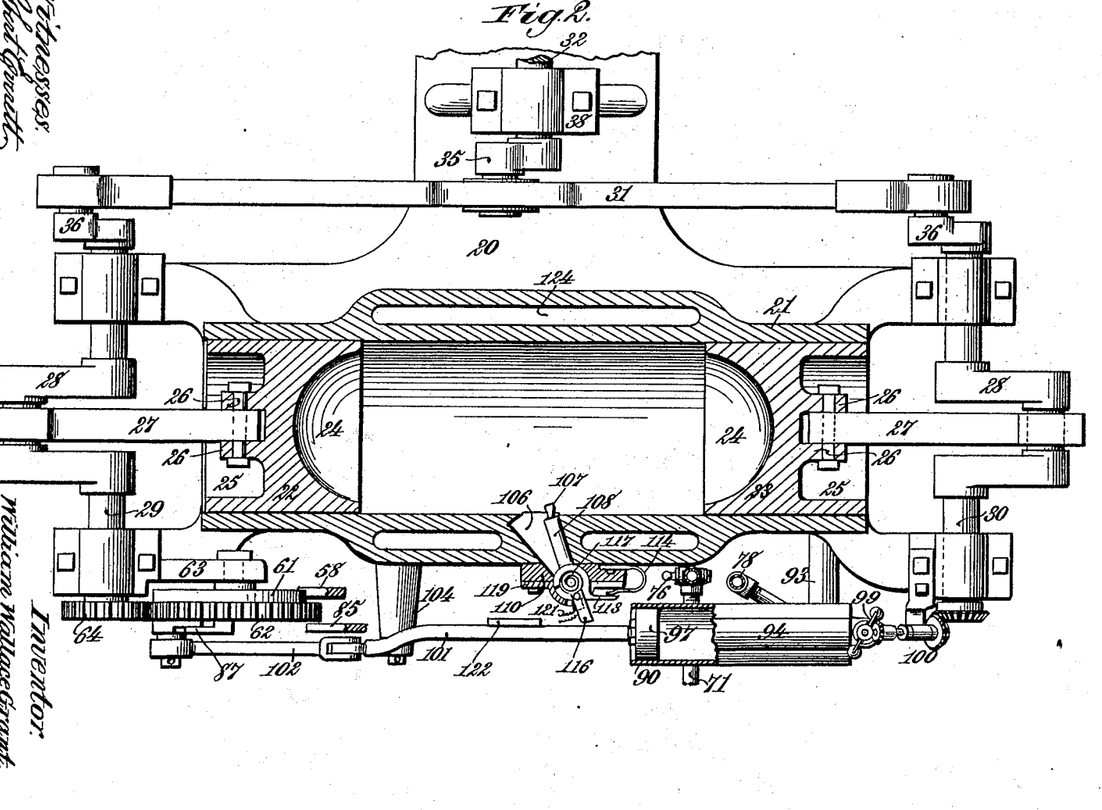
Fig. 2 is a sectional plan of the same.

On the reciprocating valve stem or rod 43, intermediate its guides, is an annular rack 52 that, no matter how the valve stem may revolve, will always maintain engagement with the teeth of a segment gear lever 53, Fig. 4, through which the valve 40 is operated. In one side of the charging and exhaust chamber 44, at a point in line with the valve rod 43, is a suitably flared opening 54 to permit passage of the oscillatory segment gear lever 53, which is provided with trunnions 55, mounted in a bearing plate or housing 56 on the outside of the chamber, and arranged in such manner as to provide, for a close fitting and easy working of said lever. The arrangement of the valve rod 43 and segment gear lever 53, in the manner described, affords the advantage of shortening the valve rod, dispensing with a stuffing box for said rod, and transferring the rack 52 and teeth of the gear lever 53 from the exterior, to the interior of the charging and exhaust chamber, and is a more compact and desirable construction than that in which the engagement of the valve rod and segment gear lever is effected on the outside of the engine. At its outer end the segment gear lever 53 is connected by a link 57, Figs. 1 and 4, to one end of a two armed lever 58 fulcrumed on a stud 59 that may be supported by one side of the engine cylinder. A spring 60, Fig. 1, is arranged to act, preferably, on the other end of the two armed lever 58 in such direction and manner as to cause it to draw down the outer end of the segment gear lever 53, so that the valve rod 43 will be moved upward and made to seat the valve 40 in position to tightly close the single charging and exhaust port 39 of the engine cylinder. In order to unseat the valve 40 and move it downward in the engine cylinder so as to open the charging and exhaust port, the further end of the two armed lever 58 is arranged to be depressed and held down for a time, by an arc-shaped cam projection or tappet 61 on the side of a spur gear 62, that is journaled to an arm 63 of the engine frame in such position, as to be engaged with and driven by a pinion 64 on an engine crank-shaft 29, as shown in Figs. 1 and 2. The arc-shaped tappet 61 may be made in adjustably connected parts to permit a lengthening or shortening of the arc according to any desired variation in the length of time that the valve 40 is to be left open. As shown, the adjustment is for the opening of the single charging and exhaust valve 40, just before the inward exhaust movement of the pistons has begun, for the expulsion of exhaust gas or vapor, and the valve will remain open until the completion of the successive charging operation, when the lever 58 will trip from the arc 61 and the valve will be instantly closed under the force of the spring 60 acting on said lever.

In this form of explosive gas engine, the charging and exhaust chamber 44 is provided near one end with a main air inlet 65, Figs. 3 and 5, that may connect with a pipe or conduit, not shown, leading from any air reservoir, as for instance an inclosed space 66, Fig. 4, in the engine base, which may be provided with screens, for excluding any gross impurities floating in the atmosphere. Near its other end, the chamber 44 is provided with an opening 67, for escape of exhaust gases or vapors, and to which may be fitted a pipe or conduit, not shown, for conducting the exhaust to a distance. In this charging and exhaust chamber 44 is a flap-valve 68, arranged to open away from the main air inlet 65 and toward the single charging and exhaust port 39 of the cylinder; and there is, also, another flap valve 69, arranged to open away from the cylinder port and toward the exhaust opening or outlet 67 of the said chamber. These flap valves 68 and 69 are, preferably, hinged at the top and provided with seats 70 for their bottoms and sides. The motive energy for actuating the engine may be derived from the explosion of a fixed gas mingled with atmospheric air, or from the explosion of a compound produced by the atomizing of a suitable liquid hydrocarbon, such as gasoline, under the action of an air blast.

In Fig. 5 is shown a form of atomizer comprising a pipe or tube 71 for conducting into the chamber 44 a suitable hydrocarbon, either liquid or gaseous, and an air blast pipe or tube 72 for supplying the force to withdraw from the tube 71 the hydrocarbon, if gaseous, or to withdraw from the tube 71 and atomize the hydrocarbon, if liquid. These pipes or tubes are provided within the chamber 44 with suitable jets 73, the mouths of which are arranged in such proximity that hydrocarbon material supplied by one jet or set of jets, will be directly subjected to the atomizing action of a blast of air from the other jet or set of jets. At this time, under the suction exerted by the simultaneously receding pistons 22 and 23, the cylinder valve 40 being open, the outlet valve 69 in the chamber 44 will be held closed, the inlet valve 68 will be swung open or inward and the atomized charge, mingled with air from the main air inlet 65, will be forcibly thrown into and drawn through the cylinder port 39 into the cylinder space between the receding pistons. Before the pistons 22 and 23 again approach each other the cylinder valve 40 will close and under the action of the simultaneously approaching pistons the charge contained in the engine cylinder will be compressed in readiness for ignition and explosion. The pipe 71, through which hydrocarbon material is supplied may lead from any suitable tank or reservoir, not shown, for containing gasoline or other liquid hydrocarbon; or the said pipe 71 may communicate with any convenient gas main, not shown, or other gas supply, if a fixed gas, either fuel or illuminating, is to be used in the engine.

Figures 6, 7, 8, 9:
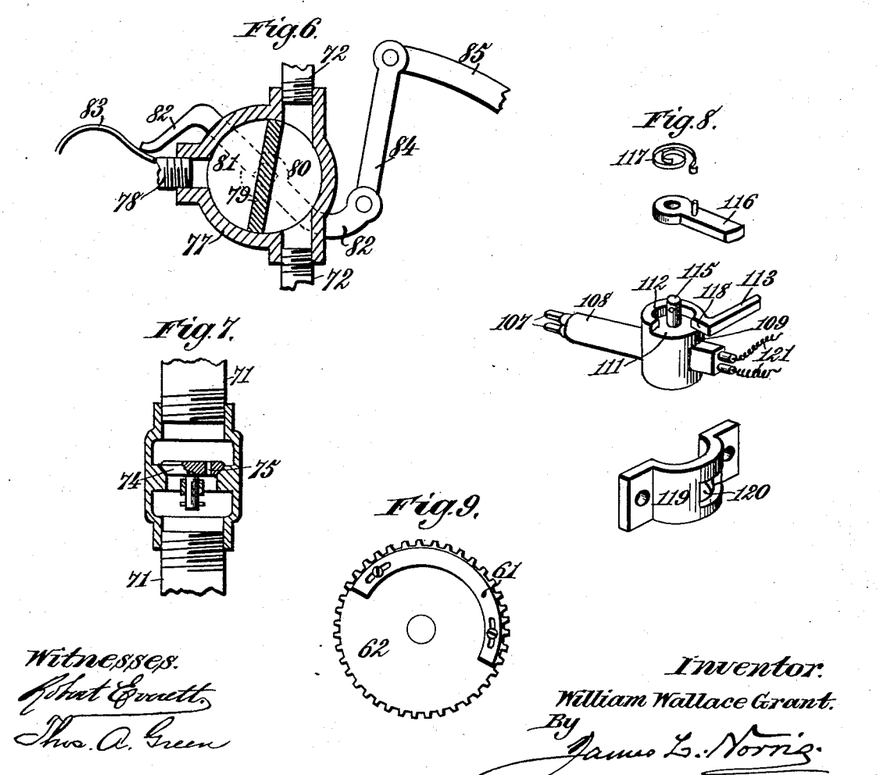
Fig. 6 is a rear or inner, sectional view of the cut-off and expansion blast valve.
Fig. 7 is a sectional view of a perforated gravity valve in the hydrocarbon supply-pipe for the atomizer.
Fig. 8 represents detail views of the oscillatory electrodes and connections.
Fig. 9 is a view of the gear from which are actuated the air compressor, the blast-valve, and the single charging and exhaust-valve of the engine cylinder.
Figure 8:
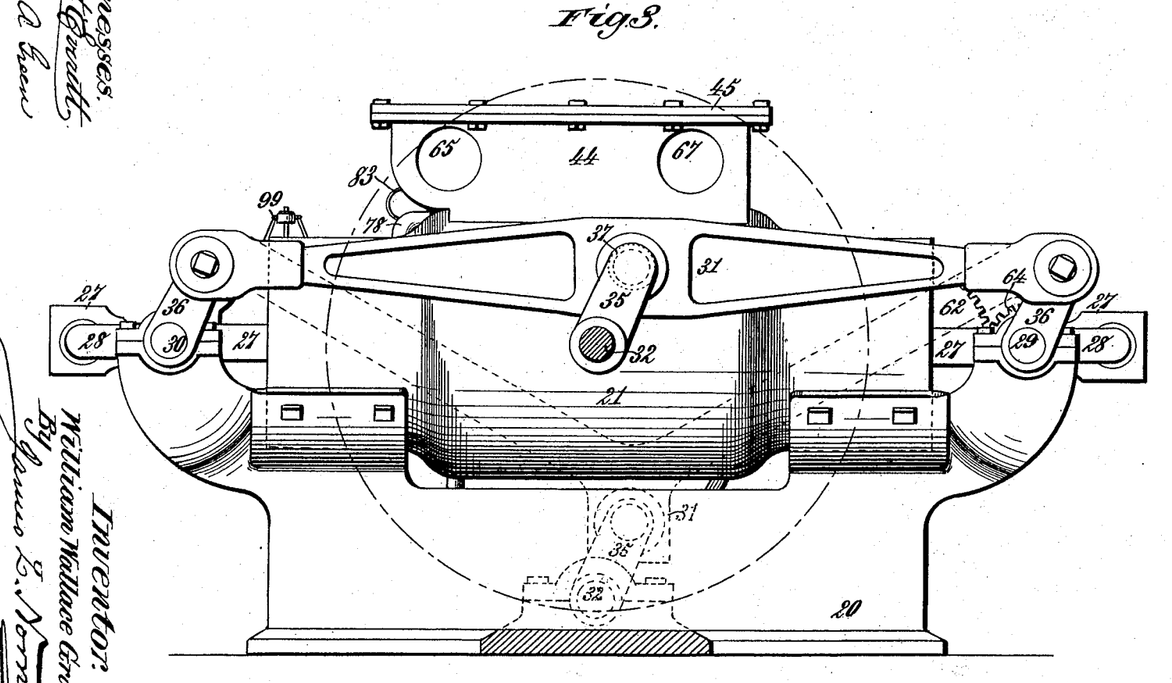

In an upper portion of the hydrocarbon supply-pipe 71 is a gravity valve 74, Figs. 1, 4, and 7, by which the level of hydrocarbon liquid will be sustained in said pipe so that the atomizer will be able to act promptly. If the atomizer 73 is to be used with a liquid hydrocarbon the gravity check-valve 74 will be provided with a vertical perforation or passage 75, the diameter of which is approximately that of the bore of the atomizer jet or tube. This perforation 75 in the valve 74 will permit the liquid hydrocarbon which fills the atomizer tube, to fall back sufficiently to prevent any leakage or overflow in consequence of a sudden cutting off of the air blast, and is more particularly useful in case the exit of the atomizer has a downward bend toward the cylinder port. When a fixed gas is to be employed for charging the engine the perforation 75 in the check-valve 74 should be omitted or plugged, and the valve should have sufficient weight to approximately balance the pressure of gas in the main. With a fixed gas larger atomizer tubes or jets should be provided in place of those employed for spraying a liquid hydrocarbon. A hand-valve 76, Figs. 1, 2, and 4, is provided in the hydrocarbon supply-pipe 71 to prevent the column of liquid hydrocarbon from falling out of the pipe when the engine is not in use; and, when so desired, to serve as a means for controlling or regulating the supply or volume of hydrocarbon passing to the atomizer.

The air blast pipe 72 is provided with an automatically actuated cut-off and expansion valve 77, Figs. 1, 4, and 6, that is normally in a closed position. This valve 77 is preferably in the form of a rotary plug with closed or solid ends and supported in a suitable cylindrical casing that intersects and communicates with the air blast pipe 72 at a convenient point. One side the valve casing communicates with a relief pipe 78 that is of somewhat larger bore than the air blast pipe, and may lead back to the reservoir 66 from which the air for the blast is drawn. In opposite sides of the valve plug and separated by a partition 79, a little to one side of the center of the plug, are passages 80 and 81, Fig. 6, of which the smaller passage 80 is adapted to establish communication through the air blast pipe 72 between the atomizer and a source of compressed air, while the larger passage 81 is designed to establish communication between the atomizer and the relief pipe. Through this larger passage 81, when the cut off and expansion valve 77 is closed, any unexpended compressed air that has passed through the valve passage 80 toward the atomizer will be permitted to expand backward through the relief pipe 78 and escape thence into the reservoir 66, or into the atmosphere, so that the atomizing and spraying of hydrocarbon will cease the instant the air blast is cut off.

On one end of the valve plug is rigidly attached a two armed lever 82 having its ends bent in opposite directions. The longer bent end of this lever 82 is arranged to be acted on by a spring 83 in such manner as to normally close the cut off and expansion valve 77, or turn it in such direction as to prevent the passage of an air blast to the atomizer and permit the escape of unexpended compressed air from the atomizer to the relief pipe. The other end of the bent two armed lever 82 is connected by a link 84 with one end of a two armed lever 85 fulcrumed on a stud 86, Fig. 1, projecting from the engine cylinder or its frame. The farther end of the lever 85 is extended in position to be depressed and held down at the proper time by the action of an arc-shaped cam projection or tappet 87 attached to one side of the gear 62 and preferably made adjustable to permit any variation in the beginning and cutting off of the air blast, or the length of time during which it is to be continued. A spring 88, Fig. 1, may be arranged to act on the lever 85 in such direction, as to restore it when released from the pressure of the arc 87, and this spring may be supported by a stop lug 89 for limiting the movement of said lever in the closing of the cut-off and expansion valve. The valve lever 85 will be engaged by the arc 87 at the conclusion of the exhaust from the engine cylinder, and will be held by it only through a part of the charging stroke, when the end of the said lever 85 will slip from the arc 87 and permit the valve 77 to instantly close and cut off the air blast under the pressure of the springs 83 and 88 provided for this purpose.

The arc-shaped projections 61 and 87 of the gear 62 are preferably arranged on opposite sides of said gear, as shown in Figs. 1, 2, and 9, and are of like construction, except, that the arc 61 for operating the levers of the cylinder valve is of greater length than the arc 87 for operating the levers of the air blast valve. Both arcs are preferably made adjustable so as to be capable of operating the valves 40 and 77 whenever upon the stroke it may be desired.

For the purpose of providing the required blast for the atomizer, an air compressing pump 90, Figs. 1, 2, and 4 is arranged in a preferably horizontal position at one side of the engine. Any suitable air compressor may be employed. In the form of construction shown, the horizontal cylinder of the air pump is provided in the lower part of one end, with an air inlet 91, Fig. 1, controlled by a gravity valve 92 and adapted to communicate, on the lifting of said valve, with an inlet or suction pipe 93 through which cleansed or filtered air may be drawn from the reservoir 66, Fig. 4, or other convenient source. In the upper part of the pump cylinder and communicating therewith at one end, is a horizontal outlet passage 94, beginning, preferably, at a point above the air inlet 91 and terminating at the lower end of the air blast pipe 72 where said blast pipe is secured to the pump cylinder. At a convenient point in or adjacent to one end of the pump cylinder, is a vent opening or relief port 95, that opens into one side of a relief pipe 96, which may communicate with the air inlet pipe 93 of the pump or lead directly into the air reservoir or to the atmosphere. This relief pipe 96 is preferably of larger internal diameter than the suction pipe of the pump, as is also the vent or relief port 95, which may be arranged opposite the pump piston 97 and intermediate the inlet 91 and outlet 94, or in any other convenient and suitable situation. In the relief pipe 96, opposite the vent or port 95, is placed a normally closed valve 98 that is connected with and controlled by any suitable governor 99 actuated positively by bevel gearing 100 from the engine crank shaft 30, as shown. The valved vent 95 is adapted to relieve any excessive degree of compression in the pump cylinder and connected blast pipe, and thereby automatically regulate the action of the engine. Should the speed of the engine be increased by a too great energy in the action of the air blast and atomizer, the governor 99 will be caused to lift the valve 98 and thus open the relief port 95 sufficiently to interrupt or diminish the action of the air blast, until the speed of the engine is properly reduced. The relief pipes 78 and 96 of the air blast valve 77 and air pump 90 should be sufficiently large to afford an easy relief for any excess of pressure in the air compressing and atomizing devices.

The piston-rod 101, of the pump piston 97, is pivotally jointed at one end to the said pump piston, and at its other end has a pivotal or jointed connection with a pitman 102 that is connected with and actuated from a wrist pin on the spur gear 62, through which gear the levers of the cylinder valve 40 and air blast or expansion and cut-off valve 77 are also operated. In order to provide the connecting joint of the pump-piston rod 101 and pitman 102 with an adequate support to prevent sagging of said parts and facilitate their required movements, a guiding and supporting lever 103, may be pivoted at its lower end to a stud 104 projecting from one side of the engine frame, and have its upper end attached to the connecting pivot of said piston-rod and pitman or, preferably, jointed to an ear 105 on one of said parts.

In one side of the engine cylinder 21, about midway its length and height is an inclined or diagonal opening or passage 106, for entrance of the oscillatory electrodes 107, employed to effect electrical ignition of the explosive charge in the cylinder. The electrodes 107 are inclosed, for the greater part of their length, in a casing or holder 108, from which they should be properly insulated. This casing or holder 108 is provided on its upper and lower sides with trunnions 109, Fig. 8, by means of which the electrodes are mounted in a housing or bracket 110 at the outer end of the opening or passage 106 which is tapered to allow sufficient room for a free oscillation of the electrodes. The end of one of the trunnions 109, preferably the uppermost, is provided with a recess or countersunk space 111, Fig. 8, nearly surrounded by a vertical rim 112, from one end of which projects, a horizontally extended arm 113 that is acted on by a spring 114, Fig. 2, in such direction as to normally cause the electrodes to project into the cylinder, in the path of one of the pistons. A pin or stud 115, in the center of the trunnion recess 111, serves as a pivot for a lever 116, that is, normally pressed— by a spring 117—in contact with a shoulder 118, at the inner end of the arm or lever 113; the two levers being extended from the trunnion at different angles. The housing 110, in which the electrode trunnions are mounted, comprises a cap piece 119 having a slot 120, Fig. 8, through which the outer end of the electrode casing or holder projects, and which is of sufficient length, to permit the required oscillatory movement of the electrodes to avoid contact with the piston 23 during a part of the exhaust stroke and a part of the charging stroke of the engine.

To the outer ends of the electrodes 107 are attached wires or conductors 121 for connection with a suitable battery (not shown) or other source of electrical energy. When thus connected with a source of electricity, the electrodes are in open circuit. As before stated the electrodes are normally held by the spring 114 in such position as to project into the engine cylinder in the path of the simultaneously approaching pistons. By reference to Fig. 2 it will be seen that the electrodes are somewhat nearer the piston 23, as it is only necessary that they should be acted on by one of the pistons. When the pistons 22 and 23 approach each other on the completion of the compressing stroke, the electrodes 107, are subjected to rubbing contact with a portion of the rim and periphery of the piston 23, first in one direction and then in the other, and the piston is thus made to act as an armature for closing the circuit through the electrodes. As the pistons recede, the electrodes are relieved from contact with the piston 23, the circuit is broken, and a spark passes, that ignites the compressed charge in the engine cylinder, so that the explosion and expansion of gases thus effected, will impart an increased impulse to the simultaneously receding pistons. By contact of the piston 23 with the electrodes they are caused to oscillate slightly against the pressure of the spring 114, which, in turn, restores them to normal position when the pressure of the piston is removed. When the pistons of the engine cylinder approach each other during an exhaust stroke, the pump piston 97, will be moving inward, to compress a further supply of air for the air blast of the atomizer, and at this time, a tappet 122, Figs. 1, 2 and 4, on the inwardly moving piston rod 101, will be made to bear on the lever 116 in such direction, that said lever, being in contact with the trunnion shoulder 118, will oscillate or swing the inner ends of the electrodes 107 out from the engine cylinder and into the recess 106, so that on the completion of the exhaust stroke, there will be no contact of the piston 23 with the electrodes. In this action of the tappet 122 on the lever 116, to effect an oscillation of the electrodes out of the path of the piston 23, the spring 114 is compressed by the arm or lever 113 bearing thereon. After the pistons 22 and 23 have commenced to recede, in the first part of the charging stroke, and the tappet 122 has slipped by the lever 116, the spring 114 will restore the electrodes to normal position. On the next outward movement of the pump piston 97 the tappet 122 will bear on the lever 116 in the opposite direction and cause it to yield or flex in the space afforded by the open side of the trunnion recess 111 without effecting any movement of the electrodes, and after the lever 116 has been again relieved from pressure it will be returned by the spring 117 to its former position. It will thus be seen that passage of the electric spark will take place only, at each second revolution of the engine shafts, or when compression of the charge in the engine cylinder has been completed in readiness for explosion, and that during the exhaust stroke of the pistons, the electrodes are automatically moved into a position, where they are rendered inoperative.

By hollowing or recessing the opposing faces of the two pistons 22 and 23 they are adapted to practically inclose the compressed charge at the time of explosion, and thus tend to protect the walls of the cylinder from effects of concussion. At the conclusion of their inward stroke, the adjacent ends of the pistons are approached as closely together as working safety will permit, and to prevent contact with the valve 40 a semi-circular recess 123 may be provided in the upper portion of the rim of each piston. The engine cylinder is preferably water-jacketed, as shown at 124, throughout the greater part of its length. The puppet-valve 40, for controlling the single charging and exhaust port 39, is so arranged and operated that it will be promptly opened at the proper time and remain open during the exhausting and charging of the cylinder, and will then be automatically closed during the compression, ignition, and expansion of the charge. When closed the valve 40 completely isolates the inlet and exhaust chamber 44 from the interior of the engine cylinder 21, and thus obviates any liability of backward flashing. During the exhaust, the flap valve or shutter 68 in the chamber 44 remains closed, and thereby protects the atomizer 73 from contact with escaping hot gases, while the flap valve or shutter 69, opens, and allows the exhaust gases and vapors to pass off freely. The several operations in the engine cylinder, as controlled by the automatic action of accompanying auxiliary parts, are successively performed in progressive time movements, and in such a manner, as to permit the safe and economical development of a high rate of speed.

By substituting for the crank 36 on the engine crank shaft 29 a fly wheel provided with a wrist pin, and making connection thereupon with the connecting bar 31—or by displacing both the cranks 36 and replacing them upon the crank shafts 29 and 30 by two fly-wheels, each provided with a wrist pin, and securing the connecting rod 31 upon said wrist pin, the engine, as is obvious, will thereupon operate uniformly, as when connection of the connecting rod 31 is made upon the cranks 36. When the engine is preferably so constructed, the lateral prolongation of the base 20 may be dispensed with, as may also the fly wheel 33, crank 35, shaft 32 and bearings 38 with their supports, power whereupon being taken from a band wheel carried upon one or both of the engine crank shafts, upon the end opposite to that upon which the flywheel is borne.

When it is desired to substitute a gaseous body for a liquid, in the development of the energy required to operate the engine, the perforated valve 74 may be plugged, or substituted by an unperforated valve, properly weighted, to approximately balance the pressure of the gas in the gas main, from which the gas for the engine is drawn. Larger tubes or jets are likewise to be preferably substituted for those employed for atomizing a liquid, the air blast then serving to withdraw the gaseous body, in sufficient volume from out the hydrocarbon supply tube 71 to effect the explosive compound required.

What I claim as my invention is—

1. In an engine, the combination with a cylinder provided with two pistons adapted to be moved simultaneously from and toward each other, and engine shafts mounted at opposite ends of said cylinder and having cranks connected with the pistons, of a continuous connecting rod, bar, or link having at its opposite ends cranked connections with said engine shafts to cause them to revolve in the same direction, and a fly-wheel shaft mounted intermediate the ends of the engine and having a cranked connection with the said connecting rod, bar, or link, substantially as described.

2. In an engine, the combination with a cylinder having two pistons adapted to simultaneously recede from and approach each other, and engine shafts connected with the pistons, of a connecting rod, bar, or link having cranked connections with said engine shafts at its opposite ends, and a counterbalancing fly-wheel, substantially as described.

3. In an engine, the combination of a cylinder having two pistons adapted to simultaneously recede from and approach each other, engine crank shafts mounted at opposite ends of the cylinder and connected with the pistons, an engine bed or frame extended to one side of the cylinder and provided with shaft bearings or supports, a fly-wheel shaft mounted in said bearings at a right angle to the engine cylinder and midway its length, and a single connecting rod, bar, or link having cranked connections with the engine crank shafts and with the intermediate flywheel shaft, substantially as described.

4. In an engine, the combination of a cylinder having two pistons adapted to simultaneously recede from and approach each other, an engine bed or frame extended to one side of the cylinder and provided with shaft bearings or supports, a fly-wheel shaft mounted in said bearings at a right angle to the engine cylinder and midway its length, engine crank-shafts mounted in said frame at opposite ends of the cylinder and connected with the pistons, and a single connecting rod, bar or link having cranked connections with the opposite engine crank shafts and formed centrally with an angle for cranked connections with the fly wheel shaft at a level other than that of the engine crank shafts, substantially as described.

5. In an engine, the combination of a cylinder having a single charging and exhaust port located intermediate the ends of and in the periphery of the cylinder, the curved interior of which is recessed or countersunk at the inner end of said port to afford a true valve seat, a conical puppet valve located in the cylinder to control said port and adapted to rest squarely and firmly in the said valve seat, two pistons adapted to simultaneously recede from and approach each other, and crank shafts mounted at opposite ends of the cylinder and connected with said pistons, substantially as described.

6. In an engine, the combination of a cylinder provided intermediate its ends with a single charging and exhaust port that is flared outward to facilitate passage of gases, a puppet valve located in the cylinder and controlling said port, and two pistons adapted to simultaneously recede from and approach each other and having their rims recessed to avoid contact with the valve, substantially as described.

7. In an engine, the combination of a cylinder having a single charging and exhaust port, an inlet and exhaust chamber adapted to communicate with the cylinder through said port, a valve located in the cylinder and having its rod extended through the port and into said chamber and provided therein with an annular rack, a segment gear lever extended through an opening in one side of the inlet and exhaust chamber and having its teeth engaged within said chamber with the rack on the valve rod, and guides for said valve rod, substantially as described.

8. In an engine, the combination of a cylinder having a single charging and exhaust port, a puppet valve controlling said port and having its valve-rod provided with a rack, a segment gear lever engaged with said rack, a two armed lever, a link connecting one end of the two armed lever with the segment gear lever, a gear actuated from the engine shaft and provided with an arc shaped tappet to act on the other end of the two armed lever and cause it to open the valve, and a spring to close said valve when the levers are released, substantially as described.

9. In an engine, the combination of a cylinder having a single charging and exhaust port intermediate its ends, an automatically actuated valve located in the cylinder and controlling said port, an inlet and exhaust chamber adapted to communicate with the cylinder through said valved port, an automatically controlled atomizer located in said chamber, valves to control the inlet and exhaust passages of said chamber, two pistons adapted to simultaneously recede from and approach each other, engine crank shafts connected with said pistons, and mechanism for controlling the action of the cylinder valve and the atomizer from the engine crank shaft, substantially as described.

10. In an engine, the combination of a cylinder having a single charging and exhaust port controlled by a single valve, an inlet and exhaust chamber communicating with the cylinder through said valved port, an atomizer located in said chamber and provided with a pipe leading from a source of hydrocarbon supply, and a gravity valve located in said pipe and provided with a perforation to obviate leakage from the atomizer, substantially as described.

11. In an engine, the combination of a cylinder having a single charging and exhaust port controlled by a valve, an inlet and exhaust chamber adapted to communicate with the cylinder through said valved port, a pipe having a weighted gravity valve located therein and arranged to supply hydrocarbon to said inlet and exhaust chamber, an air blast pipe communicating with said chamber, an automatic cut-off and expansion valve located in the blast pipe and provided with an enlarged relief passage for backward expansion on cutting off the blast, and a relief pipe of larger diameter than the blast pipe and with which the enlarged relief passage of the valve is adapted to communicate, substantially as described.

12. In an engine, the combination of a cylinder having a single charging and exhaust port controlled by a single valve, an exterior chamber adapted to communicate with the cylinder through said port and provided with inlet and exhaust passages, an atomizer located in said chamber, an air blast pipe for the atomizer, a cut off and expansion valve located in the blast pipe and provided with a rigidly attached arm or lever, a two armed lever, a link connecting one end of said two-armed lever with the rigidly attached lever of the said valve, a gear actuated from an engine crank shaft and provided with an adjustable arc shaped tappet adapted to act on one end of the two armed lever and control the opening and closing of the blast valve at any desired point in the engine stroke, and a spring for closing said valve when its levers are released, substantially as described.

13. In an engine, the combination of a cylinder having a single charging and exhaust port controlled by a valve, an inlet and exhaust chamber, an atomizer located in said chamher, an air blast pipe leading to the atomizer and provided with an automatic cut off and expansion valve, an air compressing pump cylinder discharging into said air blast pipe and provided with a valved suction pipe and having in one end a relief port or vent, and a governor controlled valve for opening and closing the said relief port of the air compressing pump, substantially as described.

14. In an engine, the combination of the engine cylinder, an atomizer, an air blast pipe leading to the atomizer and provided with an automatic cut-off and expansion valve, an air compressing pump cylinder discharging into said air blast pipe and provided with a suction pipe and a relief pipe separate from and independent of the suction and blast pipes, and a governor controlled valve located in said relief pipe of the pump, substantially as described.

15. In an engine, the combination of the engine cylinder, an atomizer having an air blast pipe provided with an automatic cut-off and expansion valve, an air compressing pump cylinder discharging into said air blast pipe and provided with a suction pipe and having in one end a relief port, a relief pipe communicating with said relief port of the pump cylinder, a valve located in said relief pipe to control the said relief port, and a governor connected with said valve and actuated positively through gearing that is driven from an engine shaft, substantially as described.

16. In an engine, the combination of a cylinder provided with a piston and having a single charging and exhaust port controlled by a valve, automatically controlled atomizing mechanism, an air compressing pump for supplying a blast of air to the atomizing devices, oscillatory electrodes normally projecting into the engine cylinder in position to make and break contact with the piston, and mechanism actuated from the piston-rod of the air compressing pump for automatically controlling the position of the electrodes to permit or prevent contact thereof with the piston in the engine cylinder, substantially as described.

17. In an engine, the combination of a cylinder provided with a piston and having a valved charging and exhaust port, an atomizer, an air compressing pump for supplying a blast of air to the atomizer, oscillatory electrodes mounted on trunnions and normally projecting into the engine cylinder in position to make and break contact with the piston therein, a lever pivoted to one of the electrode trunnions and adapted to be held rigid in one direction but capable of yielding in the opposite direction, a tappet carried on the piston-rod of the air compressing pump to actuate said lever for oscillating the electrodes into position to prevent contact with the piston of the engine cylinder, and a spring to restore the electrodes, substantially as described.

18. In an engine, the combination of a cylinder provided with a piston, an atomizer, an air compressing pump for supplying a blast of air to the atomizer, oscillatory electrodes normally projecting into the engine cylinder in position to make and break contact with the piston and mounted on trunnions one of which is provided with a recessed and shouldered end and an arm projecting therefrom, a spring arranged to bear on said arm, a spring pressed lever pivoted to the recessed and shouldered portion of said trunnion and adapted to be held rigid in one direction and to yield in the opposite direction, and a tappet carried on the piston rod of the air compressing pump to actuate said lever for oscillating the electrodes into position to escape contact with the piston of the engine cylinder, substantially as described.

19. In an engine, the combination of a cylinder having a piston and a charging and exhaust port controlled by a valve, an atomizer having a blast pipe provided with a cut-off and expansion valve, an air compressing pump communicating with said blast pipe, a gear actuated from an engine shaft and provided with arc shaped tappets, levers actuated from said tappets to open the cylinder valve and the cut-off and expansion valve of the air blast, a pitman attached to said gear and connected with the piston rod of the air compressing pump, oscillatory electrodes normally projecting into the engine cylinder in position to make and break contact with the piston therein, and a tappet carried on the pump piston rod to oscillate the electrodes into position for preventing contact with the piston of the engine cylinder, substantially as described.

20. In an engine, the combination of a cylinder having a charging and exhaust port intermediate its ends, an automatically actuated valve located in the cylinder and controlling said port, an atomizer inclosed in an inlet and exhaust chamber adapted to communicate with the cylinder through said valved port, two pistons adapted to simultaneously recede from and approach each other, engine crank shafts connected with said pistons, a blast pipe communicating with the atomizer and provided with an automatically actuated cut off and expansion valve, an air compressor connected with the blast pipe and provided with a relief port, a gear actuated from one of the engine crank shafts, levers operated from said gear to actuate the air compressor and the valves of the engine cylinder and air blast, and a valve controlled by a governor actuated from the other engine crank shaft to open and close the relief port of the air compressor, substantially as described.

21. In an engine, the combination of a cylinder having a charging and exhaust port intermediate its ends, a valve for controlling said port, two pistons that simultaneously recede from and approach each other, crank shafts connected with said pistons, an atomizer having a blast pipe provided with a cut-off and expansion valve, an air compressor connected with said blast pipe and provided with a valved relief port, mechanism for actuating the air compressor, the air blast valve and the valve of the engine cylinder from one of the engine crank shafts, a governor driven positively from the other crank shaft to control the valve at the relief port of the air compressor, and oscillatory electrodes projecting into the engine cylinder and controlled from the actuating devices of the air compressor, substantially as described.

22. In an engine, the combination of a cylinder having a valved charging and exhaust port intermediate its ends, two pistons that simultaneously recede from and approach each other, crank shafts connected with said pistons, a driving or fly-wheel shaft intermediate the engine crank shafts, a connecting rod, bar or link for causing the said engine crank shaft and fly-wheel shaft to revolve together and in the same direction, an atomizer, a valved air blast, an air compressor having a relief port, a governor controlled valve actuated from one of the engine crank shafts to open and close said port, mechanism actuated from the other crank shaft to control the air compressor and the valves of the engine cylinder and air blast, and electrodes controlled from the actuating mechanism of the air compressor, substantially as described.

In testimony whereof I have hereunto set my hand and affixed my seal in presence of two subscribing witnesses.

WILLIAM WALLACE GRANT. [L. S.]

Witnesses:
    WILLIAM J. LYNCH,
    HENRY MEYERHOLZ, Jr.